(12) United States Patent
Mulot et al.

(10) Patent No.: US 8,311,692 B2
(45) Date of Patent: Nov. 13, 2012

(54) BRAKING METHOD FOR HYBRID VEHICLES COMPENSATING FOR AN ELECTRIC BRAKING TORQUE

(75) Inventors: Vincent Mulot, Paris (FR); Remy Delplace, Bermont (FR); Olivier Mechin, Vyans le Val (FR); Yvan Le Neindre, Paris (FR); Nicolas Thauvin, Versailles (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 190 days.

(21) Appl. No.: 12/809,661

(22) PCT Filed: Dec. 20, 2007

(86) PCT No.: PCT/FR2007/052597
§ 371 (c)(1),
(2), (4) Date: Jun. 21, 2010

(87) PCT Pub. No.: WO2009/080901
PCT Pub. Date: Jul. 2, 2009

(65) Prior Publication Data
US 2010/0280695 A1      Nov. 4, 2010

(51) Int. Cl.
*G06F 17/00* (2006.01)
(52) U.S. Cl. ............... 701/22; 701/71; 701/83; 701/84
(58) Field of Classification Search ............. 701/22, 701/71, 83, 84
See application file for complete search history.

(56) References Cited

U.S. PATENT DOCUMENTS

| 6,155,365 | A  | 12/2000 | Boberg |
| 2003/0114269 | A1 | 6/2003 | Grassl et al. |
| 2003/0184152 | A1 | 10/2003 | Cikanek et al. |
| 2003/0217876 | A1 | 11/2003 | Severinsky |
| 2008/0106227 | A1 | 5/2008 | Gebert et al. |

FOREIGN PATENT DOCUMENTS

| DE | 10313519 A1 | 10/2003 |
| DE | 102005032196 A1 | 1/2007 |
| FR | 2910868 A | 7/2008 |
| GB | 2386879 A | 10/2003 |
| WO | 0206072 A | 1/2002 |
| WO | 2006051998 A | 5/2006 |

OTHER PUBLICATIONS

International Search Report of PCT Appl. No. PCT/FR2007/052957 mailed Aug. 26, 2008.

*Primary Examiner* — Ramsey Refai
(74) *Attorney, Agent, or Firm* — Nicolas E. Seckel

(57) ABSTRACT

The invention relates to a braking method for a hybrid vehicle (1) comprising a drivetrain (3) controlled by a drivetrain computer (12), and a hydraulic braking system (15) controlled by a braking computer (21). In this method, as soon as the drivetrain computer (12) detects that the electrical braking torque is decreasing, this drivetrain computer (12) informs the hydraulic braking computer (21) of the value of the reduction in electric braking torque. The braking computer (21) then operates the hydraulic braking system (15) in such a way that the hydraulic braking torque applied to the wheels (2) by the brakes (17) compensates for this reduction in electric braking torque.

11 Claims, 2 Drawing Sheets

BRAKING METHOD FOR HYBRID VEHICLES COMPENSATING FOR AN ELECTRIC BRAKING TORQUE

Figure 1:
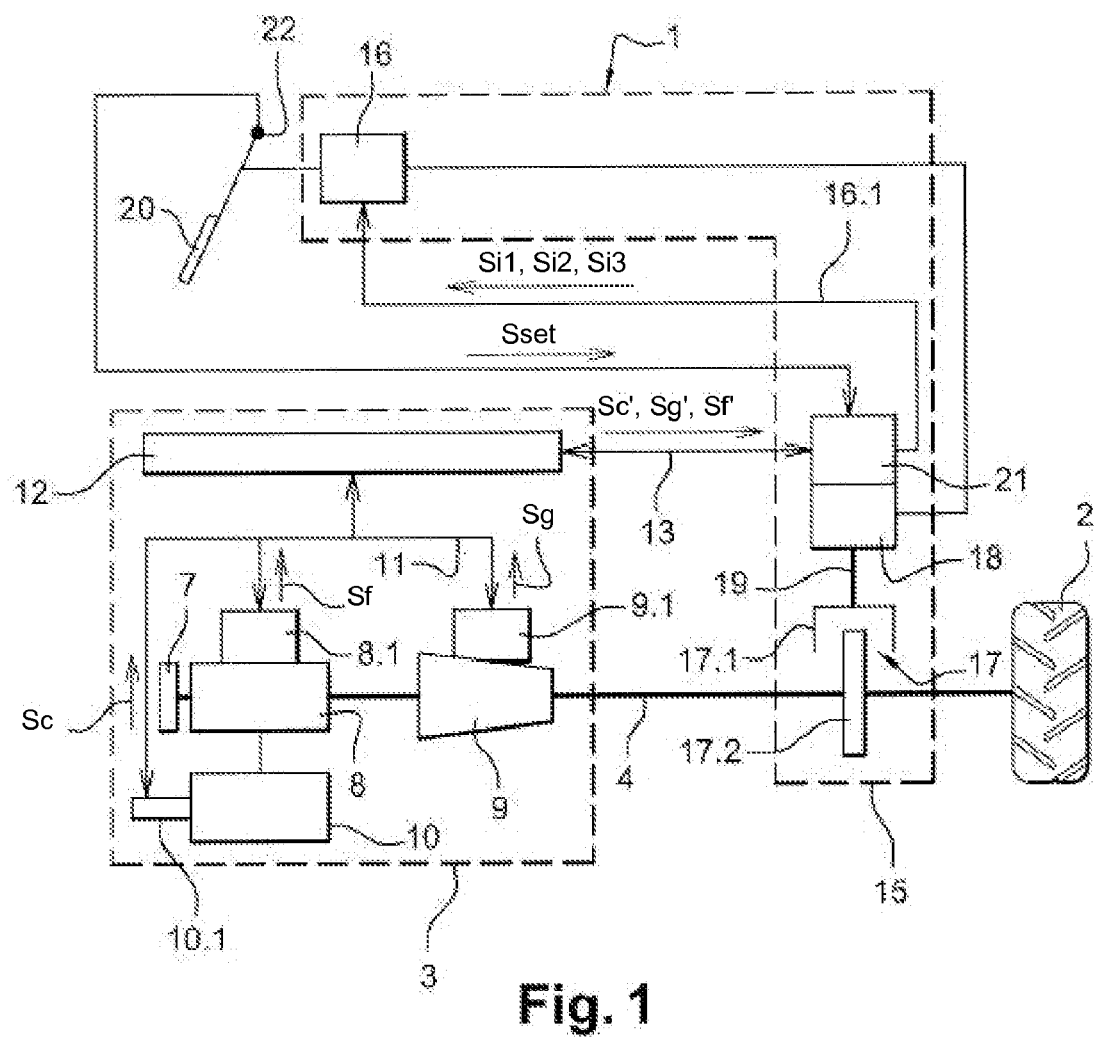

The invention relates to a braking method for hybrid vehicles in which a regenerative braking torque and a hydraulic braking torque are applied to the wheels. A particular aim of the invention is to ensure continuity in the braking torque to the wheels, in order to maintain driving comfort and vehicle safety.

The invention has a particularly advantageous application in hybrid-type vehicles, but it could also be used in all-electric vehicles.

Braking systems are known in which a regenerative braking torque and a hydraulic braking torque are applied to the wheels. The regenerative braking torque, also known as electric braking torque, is applied to the wheels by the action of an electric machine acting as a generator to recharge a battery to which it is connected. The hydraulic braking torque is applied to the wheels by means of a hydraulic system that transforms the pressure on the brake pedal into a force capable of actuating pads (or a drum) against elements that rotate with the wheels.

Two types of regenerative braking exist, and are distinguished by European legislation on braking. The first type is a category A regenerative system, which exerts a braking torque on the wheels without any driver action on the brake pedal.

The second type is a category B regenerative system, which exerts a braking torque controlled by the brake pedal. The invention has a useful application in this type of system. In particular, these systems make it possible to uncouple the action on the brake pedal from the torque produced by the conventional hydraulic braking system. Thus, they offer the possibility of controlling the distribution between the regenerative braking produced by the electric drive system and the hydraulic braking produced by the conventional hydraulic braking system.

This distribution must take place in a transparent manner and automatically adjust for variations in the electric braking torque, both for the sake of driving comfort and in order to comply with existing regulations for this kind of device.

According to these regulations, the category B electric regenerative braking system alone can be applied if intrinsic variations in the torque output are automatically compensated for by appropriate variation in the phasing relationship, as long as braking directives for reduced adhesion are followed.

That is, when there is a braking request from the driver, the electric machine can produce all or part of the torque setpoint as a replacement for (or in addition to) the hydraulic braking conventionally associated with pressing on the brake pedal. The electric braking produced in this way makes it possible to recover the vehicle's kinetic energy, to recharge the electrical storage system, and to reduce fuel consumption in the long run.

During this braking phase, vehicle deceleration can be accompanied by a gear ratio shift in an automatic transmission with torque interrupt. During this gear ratio shift, the kinematic connection between the electric machine and the wheel is broken.

The electric braking torque initially in place is then canceled for the time it takes the gear ratio to shift. This electric braking torque must be offset by the hydraulic braking system, in such a way as to maintain an overall vehicle braking level in accordance with the driver's request and to comply with the aforecited regulations.

Likewise, during a braking phase, the members of the electric drive system can experience intrinsic variations of the absorbed power due to failures that may occur, thermal limitations, or reaching the peak capacity of the storage system. Once again, electrical regeneration can be reduced or even eliminated, and will have to be offset by the hydraulic braking system.

The invention sets out to solve these problems of torque compensation in such a way that the intrinsic variations in the power supplied by the electrical system (and thus torque) remain transparent for the driver and in accordance with his request for braking and with regulations.

To this end, in the invention, torque compensation is achieved using a dialogue between the drive system computer, which controls application of the torque to the wheels by the electric machine and/or the heat engine, and the hydraulic system computer, which actuates hydraulic braking automatically, in such a way that braking remains consistent with the driver's request.

More precisely, when the electrical storage system reaches its peak storage capacity, the storage system informs the drive system computer of this fact at the moment it occurs or a few seconds before it occurs.

When the electric machine detects a failure of one of its components, or a maximum thermal limitation that has been reached, this electric machine informs the drive system computer of this failure or this maximum temperature having been reached.

When a gear change by the automatic gearbox is coming up, the gearbox informs the drive system computer of this gear change at the moment it occurs, or preferably a few hundred milliseconds before it occurs.

The drive system computer then informs the hydraulic computer that the electrical regeneration capacity is decreasing or being canceled. The drive computer also informs the hydraulic computer of the value of this reduction in electric torque.

Finally, the hydraulic computer offsets the electric torque reduction by actuating the hydraulic braking system so that the overall driver request is always met.

Two modes of compensation can be distinguished, according to whether or not a reduction in electric torque is anticipated, due to the variation in electrical power in the drive system.

That is, when a failure or a thermal limitation has not been anticipated by the drive system members, torque compensation is quick so that the reduction in braking is as little and as short as possible relative to the driver's request, so as to ensure his safety.

Conversely, when a reduction is anticipated by the components, such as a transmission ratio shift with torque interrupt or reaching the peak capacity of the storage system, compensation can take place in a way that is transparent to the driver in order to provide the greatest comfort.

The invention thus relates to a braking method for a vehicle, in particular a hybrid vehicle, this vehicle comprising:
 a drive system made up of a heat engine and an electric machine, said drive system being connected to wheels of the vehicle, said drive system being controlled by a drive system computer,
 a hydraulic braking system able to apply a hydraulic braking torque to the wheels by means of brakes, said hydraulic braking system being controlled by a brake computer, and
 a brake pedal that produces a braking torque that is applied to the vehicle wheels when it is actuated, the method comprising the following steps:
the brake pedal is actuated so that the electric machine applies an electric braking torque to the wheels,
when a gear change is anticipated by the gearbox, the gearbox informs the drive system computer of this gear change,
the drive system computer then informs the brake computer that the electric torque will be canceled during the gear change, and
the brake computer controls the braking system so as to offset the electric braking torque canceled during the gear change,
the gearbox informs the drive computer of the gear change a few hundred milliseconds before this gear change occurs, so that the electric torque is offset by the hydraulic braking torque in a progressive manner.

Figure 2:
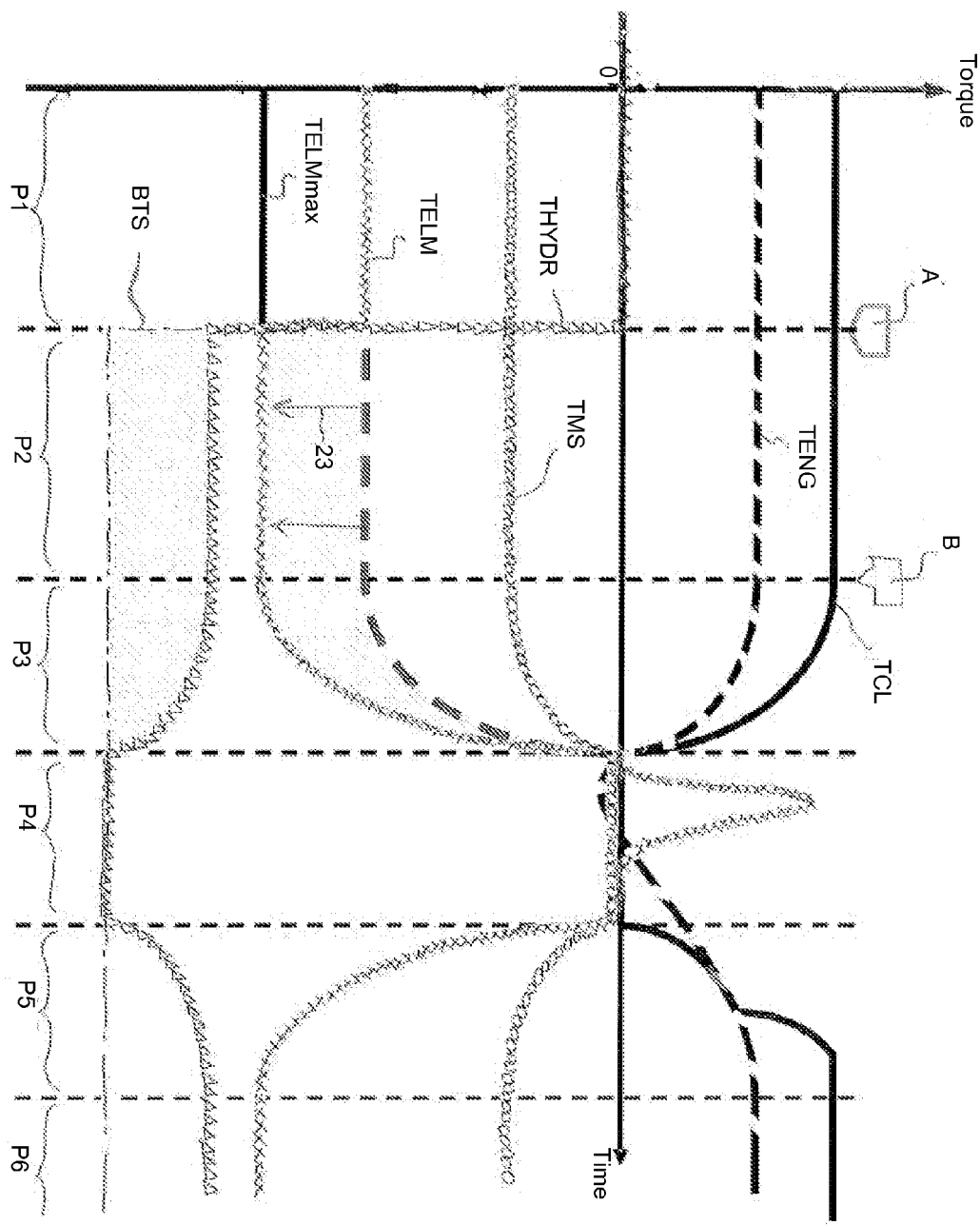

The following description and accompanying figures will make the invention more easily understood. These figures are given only as an illustration, and are in no way an exhaustive representation of the invention. They show:

FIG. 1: a schematic representation of a hybrid vehicle 1 that uses the braking method according to the invention;

FIG. 2: a graph indicating the change over time in hydraulic and electric braking torques when the gear ratio is shifted during a braking request.

More precisely, this vehicle 1 comprises a wheel 2 (the other wheels are not shown, for the sake of simplicity) driven by a drive system 3 to which it is connected via a transmission shaft 4.

The drive system 3 comprises a heat engine 7 and an electric machine 8 connected to one another via a clutch (not shown). In addition, the drive system 3 comprises an automatic gearbox 9 with torque interrupt connected to a) the electric machine 8 and b) the wheel 2 via the shaft 4.

The machine 8 is also connected to a battery- or super capacitor-type electrical storage system 10. The electric machine 8 transmits a motor torque to the wheel 2 when it is operating in motor mode and drawing power from the storage system 10. Conversely, the machine 8 transmits a regenerative braking torque when it is operating in generator mode to recharge the storage system 10 and its shaft is driven by the wheel 2. This recharge phase occurs in particular during vehicle deceleration or braking.

A drive system computer 12 controls the torque applied to the wheel 2 by the drive system 3. To this end, the computer 12 is connected via a communication bus 11 to control units 8.1, 9.1, and 10.1, respectively associated with the machine 8, the gearbox 9, and the storage system 10. The computer 12 can thus transmit instructions to the control units for the members 8-10, and receive information from these control units on the operating states of the drive system 3 members 8-10.

Additionally, the vehicle 1 comprises a hydraulic braking system 15, shown enclosed by a dashed line in the figure. This system 15 comprises an actuation system 16 that can be actuated by the driver via the brake pedal 20, or automatically, by a brake computer 21 connected to the system 16 by a connection 16.1. The system 16 transforms a mechanical force produced by actuating it into hydraulic pressure. To this end, the system 16 comprises a master cylinder and a vacuum booster brake assist device, which amplifies the force applied to the pedal 20 by the driver.

The system 16 is connected to a hydraulic unit 18. This unit 18 is connected to the wheel brakes via a system 19 of pipelines. This hydraulic unit 18 makes it possible to distribute the hydraulic pressure produced by the system 16 between brakes of the vehicle. To this end, the computer 21 associated with it calculates the pressure values to be applied to the vehicle wheels. These pressure values depend on vehicle scenarios, and in particular, on the wheel speeds measured during braking.

A braking device, or brakes 17, coupled to the wheel 2, transforms the hydraulic pressure applied to it by means of the unit 18 into a force capable of actuating the pads 17.1 against the disc 17.2 rotating with the wheel 2.

In this way the mechanical force produced by actuating the pedal 20, or automatically by the computer 21, is transformed into hydraulic pressure by the system 16. This pressure is transmitted to the hydraulic unit 18, which distributes it between the brakes. And the brakes 17 apply a mechanical braking torque, known as hydraulic torque, to the wheels.

A pedal depression sensor 22 is connected to an input of the brake computer 21. This sensor 22 emits a signal Sset relative to the braking torque Tset desired by the driver. The computer 21 thus knows the driver's braking request at each instant.

The computers 12 and 21 are connected to one another via a connection 13, so as to exchange information about the electric and/or hydraulic braking torques being applied to the wheels.

In initial operating conditions, the driver actuates the brake pedal 20, so that the electric machine 8, operating as a generator, applies an electric braking torque to the wheels. In addition, a transmission ratio is locked in via the automatic gearbox 9, and the hydraulic braking system is partially in operation or not at all.

At this point, there is a change in the available regenerative braking power. This change in available power can occur in three scenarios in particular, described below.

In a first scenario, the control unit 10.1 associated with the storage system 10 detects that the storage system 10 has reached or will soon reach peak capacity. The control unit 10.1 then emits a signal Sc that goes to the drive system computer 12 via the communication bus 11. In an implementation, this signal Sc is emitted ahead of time, 2 to 3 seconds before the peak storage capacity is actually reached.

The computer 12 then receives the signal Sc and emits a signal Sc' that goes to the hydraulic computer 21 via the connection 13. This signal Sc' relates to the reduction in electric torque due to the fact that the storage system 10 has reached or will soon reach peak capacity. This signal Sc' contains the value by which electric braking torque decreases when this peak capacity is reached.

The computer 21 receives the signal Sc' and then emits a control signal Si1 that goes to the system 16. This signal Si1 controls the system 16 in such a way that the hydraulic braking torque offsets the reduction in electric braking torque and that the overall braking torque requested by the driver is maintained.

The system 16 is controlled so that hydraulic torque compensates for electric torque in a way that is transparent to the driver so as to provide maximum comfort. To this end, the torque is offset progressively. This sort of control is made possible by the fact that the information about the storage system 10 reaching peak capacity is transmitted to the hydraulic braking system ahead of time.

In a second scenario, when a change of gear is anticipated by the automatic gearbox 9, the control unit 9.1 associated with the gearbox 9 emits a signal Sg that goes to the computer 12 via the communication bus 11. In an implementation, this signal Sg is emitted ahead of time, 100 to 200 milliseconds before the gear change actually happens.

The computer 12 then receives the signal Sg and emits a signal Sg' that goes to the hydraulic computer 21 via the connection 13. This signal Sg' relates to the fact that the electric braking torque will be canceled during the gear change. The signal Sg' can contain the duration of the gear change.

The computer 21 receives the signal Sg' and then emits a control signal Si2 that goes to the actuation system 16. This signal Si2 controls the system 16 so that the hydraulic braking torque offsets the loss of electric braking torque during the gear change and that the overall braking torque requested by the driver is maintained.

Here again, the system 16 is controlled so that hydraulic torque compensates for electric torque in a way that is transparent to the driver so as to provide maximum comfort. To this end, the torque is offset progressively. This sort of control is made possible by the fact that the information about the gear change is transmitted to the hydraulic braking system ahead of time.

In a third scenario, when the electric machine 8 detects a failure of one of its components or reaches a maximum operating temperature, the control unit 8.1 emits a signal Sf that goes to the computer 12 via the communication bus 11.

The computer 12 then receives the signal Sf and emits a signal Sf' that goes to the hydraulic computer 21 via the connection 13. This signal Sf' relates to the reduction in electric torque due to the electric machine 8 failing or overheating. The signal Sf' comprises the value by which electric torque is reduced, and also, in the case of overheating, the amount of time torque will be reduced so that the temperature of the machine 8 can go back down under the maximum value.

The computer 21 receives the signal Sf' and then emits a control signal Si3 that goes to the system 16. This signal Si3 controls the system 16 so that the hydraulic braking torque offsets the reduction in electric braking torque and that the overall braking torque requested by the driver is maintained.

As the reduction in torque is not anticipated in this case, the system 16 is controlled so that the reduction in braking is as little and as short as possible relative to the driver's request, so as to ensure his safety. To this end, the torque is offset quickly, the hydraulic braking torque change being in the shape of a step.

As a variant, the drive system computer 12 does not transmit the value of the reduction in electric torque to the brake computer 21. In this case, the brake computer 21 calculates the difference between the torque requested by the driver Cset and the torque actually applied to the wheels. The computer 21 controls the hydraulic system 16 so that the system 16 applies a hydraulic braking torque with the value of this torque difference to the wheels.

FIG. 2 shows a graph indicating the change over time in hydraulic braking torque THYDR applied by the braking system 15, the change in the electric braking torque TELM applied by the electric machine 8, the change in the heat engine 7 torque TENG, the change in the clutch torque TCL, and the change in the torque TMS observed on the main shaft when a gear ratio is shifted while the driver is braking with a requested torque setpoint value BTS.

During the first phase P1, the driver has lifted his foot off the accelerator pedal and is not pressing on the brake pedal 20. The drive system is in regeneration mode in which the electric machine 8 is operating as a generator. The electric braking torque TELM is less than the maximum torque TELMmax available from the machine 8.

During the second phase P2, the driver A presses on the brake pedal 20 in such a way that a braking torque setpoint BTS is applied. The electric braking torque TELM then increases 23 up to the maximum potential TELMmax of the electric machine 8. Hydraulic braking THYDR is added to the braking torque TELM applied by the electric machine 8 so that the sum of the electric machine braking torque TELM and the hydraulic braking torque THYDR is equal to the braking torque setpoint BTS requested by the driver (TELM+THYDR=BTS)

During the third phase P3, a gear ratio shift B is requested. The main shaft torque TMS (which is equal to the engine torque TENG and the torque applied by the electric machine TELM) is then reduced to zero to make it possible to disengage the initial gearbox ratio. The torque TMS is reduced to zero torque progressively. The hydraulic braking torque THYDR increases so as to offset the electric part of the torque TELM that was added in during phase P2. In this way, the braking torque BTS ordered by the brake pedal 20 is always maintained.

During the fourth phase P4, the torques transmitted by the gearbox are zero (TELM and TENG are zero) so that the gear ratio shift can be done easily, and then the final gear ratio is engaged.

During the fifth phase P5, the various torques increase progressively so as to return to the situation in phase P2. In particular, the hydraulic braking torque THYDR is once again reduced as the electric torque TELM is increased.

During the sixth phase P6, the various torques return to the values they had during phase P2.

The invention claimed is:

1. Braking method for a vehicle having wheels, in particular a hybrid vehicle, said vehicle comprising:
   a drive system comprising a heat engine, an electric machine, and an automatic gearbox with torque interrupt, wherein the automatic gearbox is connected (i) to the electric machine and (ii) to the vehicle wheels,
   a drive system computer, said drive system being controlled by the drive system computer,
   a hydraulic braking system, said hydraulic braking system applying a hydraulic braking torque to the vehicle wheels by means of brakes when said hydraulic braking system is actuated,
   a brake computer, said hydraulic braking system being controlled by the brake computer, and
   a brake pedal, said brake pedal producing a braking torque applied to the vehicle wheels when said brake pedal is actuated,
   wherein the method comprises:
   actuating the brake pedal, wherein the electric machine applies an electric braking torque to the wheels,
   when a gear change is anticipated by the gearbox, transmitting information from the gearbox to the drive system computer that a gear change is anticipated,
   then, transmitting information from the drive system computer to the brake computer that an electric braking torque will be canceled during the gear change, wherein the gear change starts at a gear change starting time and the transmitting of the information that the electric braking torque will be canceled during the gear change is performed at a first information transmission time earlier than the gear change starting time,
   controlling the hydraulic braking system by the brake computer, wherein the hydraulic braking system offsets the electric braking torque canceled during the gear change, and
   offsetting the electric braking torque by the hydraulic braking torque in a progressive manner over a first time period between the first information transmission time and the gear change starting time.

2. The method according to claim 1, wherein the electric machine is connected to an electrical storage system, and wherein the method comprises the following steps:

when the electrical storage system reaches a peak storage capacity, transmitting information from the electrical storage system to the drive system computer about the peak storage capacity having been reached, then, transmitting information from the drive system computer to the brake computer about a value of a reduction of the electric braking torque when the peak storage capacity of the electrical storage system is reached, and controlling the hydraulic braking system using the brake computer, wherein the hydraulic braking system offsets the value of the reduction in electric braking torque.

3. The method according to claim 2, comprising:

transmitting information from the electrical storage system to the drive computer that the electrical storage system is reaching the peak charge capacity, wherein the electrical storage system reaches the peak storage capacity at a peak storage capacity reaching time and the transmitting of the information that the electrical storage system is reaching the peak charge capacity is performed at a second information transmission time which is earlier than the peak storage capacity reaching time, wherein the hydraulic braking torque offsets the electric braking torque in a progressive manner over a second time period between the second information transmission time and the peak storage capacity reaching time.

4. The method according to claim 1, comprising:

when the electric machine detects a failure of a component of the electric machine, or reaches a maximum operating temperature, transmitting information from the electric machine to the drive system computer on the component failure or on the maximum operating temperature having been reached, then, transmitting information from the drive system computer to the brake computer on the value of the reduction in the electric braking torque because of the component failure or the maximum operating temperature having been reached, and controlling the hydraulic braking system using the brake computer, wherein the hydraulic braking system offsets the reduction in the electric braking torque.

5. The method according to claim 4, wherein:

the hydraulic braking torque applied to the vehicle wheels as compensation for the reduction in the electric braking torque is in a shape of a step.

6. The method according to claim 2, comprising:

when the electric machine detects a failure of a component of the electric machine, or reaches a maximum operating temperature, transmitting information from the electric machine to the drive system computer on the component failure or the maximum operating temperature having been reached, respectively, then, transmitting information from the drive system computer to the brake computer on the value of the reduction in the electric braking torque because of the component failure or the maximum operating temperature having been reached, respectively, and controlling the hydraulic braking system using the brake computer, wherein the hydraulic braking system offsets the reduction in the electric braking torque.

7. The method according to claim 6, wherein:

the hydraulic braking torque applied to the vehicle wheels as compensation for the reduction in the electric braking torque is in a shape of a step.

8. The method according to claim 3, comprising:

when the electric machine detects a failure of a component of the electric machine, or reaches a maximum operating temperature, transmitting information from the electric machine to the drive system computer on the component failure or the maximum operating temperature having been reached, respectively, then, transmitting information from the drive system computer to the brake computer on the value of the reduction in the electric braking torque because of the component failure or the maximum operating temperature having been reached, respectively, and controlling the hydraulic braking system using the brake computer, wherein the hydraulic braking system offsets the reduction in the electric braking torque.

9. The method according to claim 8, wherein:

the hydraulic braking torque applied to the vehicle wheels as compensation for the reduction in the electric braking torque is in a shape of a step.

10. The method according to claim 1, wherein the first time period has a duration of from 100 to 200 milliseconds.

11. The method according to claim 3, wherein the second time period has a duration of from 2 to 3 seconds.

* * * * *